United States Patent
Berezhna et al.

(10) Patent No.: US 11,215,557 B2
(45) Date of Patent: *Jan. 4, 2022

(54) METHODS AND SYSTEMS FOR ASSESSING FLOW CELL CLEANLINESS

(71) Applicant: Abbott Laboratories, Abbott Park, IL (US)

(72) Inventors: Svitlana Y. Berezhna, Los Gatos, CA (US); JrHung T. Tsai, Abbott Park, IL (US); David Spalding, Abbott Park, IL (US); Mahesh R. Junnarkar, San Jose, CA (US); Chia-Fa Hsu, Abbott Park, IL (US)

(73) Assignee: Abbott Laboratories, Abbott Park, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/099,553

(22) Filed: Nov. 16, 2020

(65) Prior Publication Data

US 2021/0131962 A1   May 6, 2021

Related U.S. Application Data (63) Continuation of application No. 16/848,648, filed on Apr. 14, 2020, now Pat. No. 10,866,187, which is a
(Continued)

(51) Int. Cl.
*G01N 21/51* (2006.01)
*G01N 15/14* (2006.01)
(Continued)

(52) U.S. Cl.
CPC .......... *G01N 21/51* (2013.01); *G01N 15/1404* (2013.01); *G01N 15/1459* (2013.01); *G01N 21/15* (2013.01); *G01N 2015/1006* (2013.01); *G01N 2021/157* (2013.01); *G01N 2021/4707* (2013.01); *G01N 2201/06113* (2013.01); *G01N 2201/129* (2013.01)

(58) Field of Classification Search
CPC .......... G01N 15/1459; G01N 15/1404; G01N 21/51; G01N 21/15; G01N 2021/4707; G01N 2021/157; G01N 2201/06113; G01N 2201/129; G01N 2015/1006
See application file for complete search history.

(56) References Cited

U.S. PATENT DOCUMENTS 3,773,424 A   11/1973   Selgin
4,161,363 A   7/1979    Kahle
(Continued)

FOREIGN PATENT DOCUMENTS

EP   1349244   10/2003
EP   1761979   3/2007

*Primary Examiner* — Sang H Nguyen
(74) *Attorney, Agent, or Firm* — Edward J. Baba; Mandar A. Joshi; Bozicevic, Field & Francis LLP (57) ABSTRACT

Provided are methods of assessing the cleanliness of a flow cell of a flow cytometric system. The provided methods include computing a ratio of post-flow cell and pre-flow cell light beam intensities and using such a ratio to assess the cleanliness of the flow cell. Flow cytometric systems capable of monitoring the cleanliness of a flow cell contained within the system are also provided.

26 Claims, 1 Drawing Sheet

Related U.S. Application Data continuation of application No. 15/987,616, filed on May 23, 2018, now Pat. No. 10,648,909.

(60) Provisional application No. 62/511,249, filed on May 25, 2017.

(51) Int. Cl.
*G01N 21/15* (2006.01)
*G01N 21/47* (2006.01)
*G01N 15/10* (2006.01)

(56) References Cited

U.S. PATENT DOCUMENTS

| | | | |
|---|---|---|---|
| 4,823,354 A | 4/1989 | Znotins et al. | |
| 4,838,692 A | 6/1989 | Brenholdt | |
| 5,699,156 A | 12/1997 | Carver | |
| 5,751,750 A | 5/1998 | Friede et al. | |
| 5,936,986 A | 8/1999 | Cantatore et al. | |
| 6,130,753 A | 10/2000 | Hopkins, Jr. et al. | |
| 6,228,652 B1 | 5/2001 | Rodriguez et al. | |
| 6,370,407 B1 | 4/2002 | Leszinske | |
| 6,507,400 B1* | 1/2003 | Pina | G01N 15/1456 356/338 |
| 6,539,036 B2 | 3/2003 | Lehr et al. | |
| 6,774,368 B2 | 8/2004 | Busch et al. | |
| 7,295,585 B2 | 11/2007 | Sandberg et al. | |
| 7,738,796 B2 | 6/2010 | Sanchez | |
| 9,869,625 B2 | 1/2018 | Spriggs et al. | |
| 2002/0093641 A1* | 7/2002 | Ortyn | G01N 15/147 356/28 |
| 2003/0025909 A1 | 2/2003 | Hallstadius | |
| 2004/0011975 A1 | 1/2004 | Nicoli et al. | |
| 2004/0265175 A1 | 12/2004 | Witty et al. | |
| 2006/0100524 A1 | 5/2006 | Lucassen et al. | |
| 2007/0043510 A1* | 2/2007 | Yang | G01N 21/6428 702/19 |
| 2008/0008292 A1* | 1/2008 | Krmar | A61B 6/505 378/89 |
| 2008/0221812 A1 | 9/2008 | Pittaro et al. | |
| 2008/0304048 A1 | 12/2008 | Tormod | |
| 2009/0122311 A1* | 5/2009 | Kanda | G01N 21/645 356/318 |
| 2010/0090677 A1 | 4/2010 | Britton et al. | |
| 2012/0135405 A1 | 5/2012 | Toumbas | |
| 2015/0104786 A1 | 4/2015 | Shirasuna et al. | |
| 2015/0346091 A1* | 12/2015 | Obara | G01N 15/1434 356/338 |
| 2016/0061732 A1 | 3/2016 | Yamada et al. | |
| 2016/0202164 A1 | 7/2016 | Trainer | |
| 2016/0252443 A1 | 9/2016 | Spriggs | |

* cited by examiner

METHODS AND SYSTEMS FOR ASSESSING FLOW CELL CLEANLINESS

CROSS-REFERENCE TO RELATED APPLICATIONS

This application is a continuation of U.S. patent application Ser. No. 16/848,648 filed Apr. 14, 2020, issued as U.S. Pat. No. 10,866,187, which application is a continuation of U.S. patent application Ser. No. 15/987,616 filed May 23, 2018, issued as U.S. Pat. No. 10,648,909, which claims the benefit of U.S. Provisional Patent Application No. 62/511,249 filed May 25, 2017, which application is incorporated herein by reference in its entirety.

BACKGROUND

Flow cytometry is a powerful tool for cell analysis in both research and clinical applications. However, flow cytometers are highly sensitive, sophisticated instruments requiring regular maintenance, calibration, alignment and cleaning for proper functioning. Dirty or contaminated components of flow cytometers can generate spurious results that can mislead research findings or prevent proper diagnosis in clinical applications.

Conventionally, as the appearance of dirt or other contamination is inherently unpredictable, the experience of the flow cytometer operator has been relied upon to identify when a flow cytometry system is functioning aberrantly and may require cleaning. Such reliance on a human operator for detecting when a component of a flow cytometer, such as a flow cell, needs to be cleaned places a burden on the operator and may result in continued use of a system in a contaminated state, where such contamination may negatively impact the obtained data. In other instances, the accumulation of dirt or other contaminates on a component of a flow cytometer may be minor or gradual, thus evading notice by even an experienced technician.

SUMMARY

Provided are methods of assessing the cleanliness of a flow cell of a flow cytometric system. The provided methods include computing a ratio of post-flow cell and pre-flow cell light beam intensities and using such a ratio to assess the cleanliness of the flow cell. Flow cytometric systems capable of monitoring the cleanliness of a flow cell contained within the system are also provided.

DEFINITIONS

The term "assessing" includes any form of measurement, and includes determining if an element is present or not. The terms "determining", "measuring", "evaluating", "assessing" and "assaying" are used interchangeably and include quantitative and qualitative determinations. Assessing may be relative or absolute. "Assessing the identity of" includes determining the most likely identity of a particular compound or formulation or substance, and/or determining whether a predicted compound or formulation or substance is present or absent. "Assessing the quality of" includes making a qualitative or quantitative assessment of quality e.g., through the comparisons of a determined value to a reference or standard of known quality.

The term "bodily fluid" as used herein generally refers to fluids derived from a "biological sample" which encompasses a variety of sample types obtained from an individual or a population of individuals and can be used in a diagnostic, monitoring or screening assay. The definition encompasses blood and other liquid samples of biological origin. The definition also includes samples that have been manipulated in any way after their procurement, such as by mixing or pooling of individual samples, treatment with reagents, solubilization, or enrichment for certain components, such as nucleated cells, non-nucleated cells, pathogens, etc.

The term "biological sample" encompasses a clinical sample, and also includes cells in culture, cell supernatants, cell lysates, serum, plasma, biological fluid, and tissue samples. The term "biological sample" includes urine, saliva, cerebrospinal fluid, interstitial fluid, ocular fluid, synovial fluid, blood fractions such as plasma and serum, and the like.

The terms "control", "control assay", "control sample" and the like, refer to a sample, test, or other portion of an experimental or diagnostic procedure or experimental design for which an expected result is known with high certainty, e.g., in order to indicate whether the results obtained from associated experimental samples are reliable, indicate to what degree of confidence associated experimental results indicate a true result, and/or to allow for the calibration of experimental results. For example, in some instances, a control may be a "negative control" assay such that an essential component of the assay is excluded such that an experimenter may have high certainty that the negative control assay will not produce a positive result. In some instances, a control may be "positive control" such that all components of a particular assay are characterized and known, when combined, to produce a particular result in the assay being performed such that an experimenter may have high certainty that the positive control assay will not produce a positive result. Controls may also include "blank" samples, "standard" samples (e.g., "gold standard" samples), validated samples, etc.

The term "inputting", as used herein, is used to refer to any way of entering information into a computer, such as, e.g., through the use of a user interface. For example, in certain cases, inputting can involve selecting a reference spectrum or a spectral characteristic or library thereof that is already present on a computer system. In other cases, inputting can involve adding a spectrum or a spectral characteristic to a computer system, e.g., by measuring the spectrum of a sample on a device capable of interfacing with a computer. Inputting can also be done using a user interface.

By "data processing unit", as used herein, is meant any hardware and/or software combination that will perform the functions required of it. For example, any data processing unit herein may be a programmable digital microprocessor such as available in the form of an electronic controller, mainframe, server or personal computer (desktop or portable). Where the data processing unit is programmable, suitable programming can be communicated from a remote location to the data processing unit, or previously saved in a computer program product (such as a portable or fixed computer readable storage medium, whether magnetic, optical or solid state device based).

As used herein, the term "executing" is used to refer to an action that a user takes to initiate a program.

DETAILED DESCRIPTION

Provided are methods of assessing the cleanliness of a flow cell of a flow cytometric system. The provided methods include computing a ratio of post-flow cell and pre-flow cell light beam intensities and using such a ratio to assess the cleanliness of the flow cell. Flow cytometric systems capable of monitoring the cleanliness of a flow cell contained within the system are also provided.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

Methods and Systems

As summarized above, the present disclosure includes methods of assessing the cleanliness of a flow cell in a flow cytometric instrument. An aspect of the present methods include calculating a ratio of the pre- and post-flow cell light beam intensities and using the ratio to determine the cleanliness of the flow cell.

Flow cells of flow cytometric devices will generally be constructed of optically transparent material, including but not limited to e.g., glass, quartz, optically clear plastic, and the like. The present methods may include flowing a cell-free medium through the flow cell during the assessment of flow cell cleanliness. A cell-free medium will not contain cells and useful cell-free mediums may be substantially free of any light scattering and/or absorbing particles. As such, a flow cell containing a cell-free medium (i.e., having a cell-free medium flowed through the flow cell) will generally be optically clear, i.e., may allow for 100% transmittance or nearly 100% transmittance (e.g., greater than 99.9% transmittance, greater than 99.5% transmittance, greater than 99.0% transmittance, greater than 98.5% transmittance, etc.) of light through the flow cell.

Useful cell-free mediums may include but are not limited to e.g., water (e.g., deionized water), sheath solvent (i.e., sheath fluid), buffer (e.g., balanced salt solutions including e.g., saline, phosphate buffered saline (PBS), TRIS-buffered saline (TBS), Earle's balanced salt solution (EBSS), Gey's balanced salt solution (GBSS), Hanks' balanced salt solution (HBSS), Puck's balanced salt solution, Ringer's balanced salt solution (RBSS), Simm's balanced salt solution (SBSS), Tyrode's balanced salt solution (TBSS), and the like), cell culture media, combinations thereof, and the like.

A clean flow cell, containing optically transparent cell-free medium, will allow for essentially 100% transmittance or nearly 100% transmittance (e.g., greater than 99.9% transmittance, greater than 99.5% transmittance, greater than 99.0% transmittance, greater than 98.5% transmittance, etc.) of light through the flow cell. As such, without being bound by theory, the intensity of a light beam passing through a flow cell containing an essentially optically transparent cell-free medium will be equal before and after the beam passes through the flow cell. Put another way, no loss, or essentially no loss, in beam intensity is expected when a light beam passes through a clean flow cell containing an essentially optically transparent cell-free medium.

Correspondingly, a flow cell having one or more contaminants is expected to at least partially prevent light from transmitting through the flow cell and reaching a detector. The light prevented from passing through the flow cell by a contaminant may be obstructed in various ways including e.g., where the light is scattered, reflected, absorbed, etc. The transmittance of a light beam through a flow cell containing a contaminant will generally be less than 100%, where the actual level of transmittance may vary depending on the level of contamination and may include less than 99% transmittance, less than 98% transmittance, less than 97% transmittance, less than 96% transmittance, less than 95% transmittance, less than 90% transmittance, less than 85% transmittance, etc.

Generally, the fluidics system of a flow cell used in flow cytometry applications is configured to produce an inner stream of sample fluid surrounded by an outer sleeve of sheath fluid. Under optimal conditions (laminar flow) there is no mixing of the central sample fluid stream and the sheath fluid. Thus, the sheath fluid often provides a layer protecting the flow cell from elements or particles in sample fluids that could affect the cleanliness of the flow cell. However, despite this configuration, contaminants may contact, adhere to and/or otherwise build up on the walls of the flow cell, e.g., through mixing of the sheath and sample fluids. In some instances, contaminants may be introduced directly into the sheath fluid, thereby allowing them to be deposited on the walls of the flow cell, e.g., through direct contamination of the sheath fluid. Contaminants will vary and may include but are not limited to e.g., proteins, cellular components, crystalized salts, dust, oils, and the like.

As the presence of contaminants on the flow cell may prevent a light beam from completely transmitting through the flow cell, measuring a ratio of the pre- and post-flow cell intensities of a light beam can be used to identify the presence of a contaminant on a flow cell. The present methods may include flowing a cell-free medium through the flow cell and emitting a light beam from an emitter through the cell-free medium-containing flow cell and measuring the intensity of the light beam before and after passage through the flow cell.

Essentially any light source emitting a light beam (e.g., a laser or other focused light) of a flow cytometer may be employed in the subject methods. In some instances, a light beam employed in present methods may be a forward scatter light beam, a side scatter light beam, a fluorescent laser (e.g., an excitation laser), and the like. According to the described methods, the light beam may be collected at at least two points, one point prior to passing through the flow cell and one point after passing through the flow cell. Essentially any optical geometry may be configured to allow for the collection of pre- and post-flow cell light of a subject light beam, including e.g., where one or more optical components are employed in the beam path to direct and/or shape the beam as desired. Useful optical components may include but are not limited to e.g., lenses, mirrors (including e.g., dichroic mirrors), filters, beam splitters, and the like.

In some instances, one emitter is utilized in the subject methods, i.e., a sole emitter is used. In some instances, multiple emitters are utilized in the subject methods, including but not limited to e.g., 2 emitters, 3 emitters, etc. In some instances, a first emitter emits light at a first power and a second emitter emits light at a second power. In some instances, a third emitter is employed, including e.g., where the third emitter emits light at a third power.

In some instances, the optical components, e.g., the light beam emitter, the detector(s) (e.g., pre-flow cell detector or post-flow cell detector), a beam splitter, etc., utilized in the present methods may be pre-existing components of a flow cytometry system, i.e., the component may have a primary function other than its use in the flow cell cleanliness assaying of the present methods. Components having functions besides their use in the subject methods of cleanliness assessment may be referred to as multi-use components. Multi-use components may include, e.g., multi-use detectors, multi-use light beam emitters, multi-use beam splitters, and the like. Essentially any component of a flow cytometric system utilized in the subject methods may be multi-use.

Other functions, i.e., besides use in the presently described cleanliness assessments, for which the subject components may be used include but are not limited to e.g., forward scatter, side scatter, light beam measuring, light beam monitoring (e.g., light beam quality control), fluorescence excitation, fluorescence emission collection, and the like.

In some instances, the optical components, e.g., the light beam emitter, the detector(s) (e.g., pre-flow cell detector or post-flow cell detector), a beam splitter, etc., utilized in the present methods may be designated cleanliness-monitoring components of a flow cytometry system, i.e., the component may have no other function besides its use in the flow cell cleanliness assaying of the present methods. Designated cleanliness-monitoring components of a flow cytometry system may be referred to as designated components. Useful designated components may include, e.g., designated detectors, designated light beam emitters, designated beam splitters, and the like. Essentially any component of a flow cytometric system utilized in the subject methods may be a designated component only for use in the herein described methods.

The optical components of the herein described methods may include a mixture of designated and multi-use components or may exclusively include only designated components or only multi-use components. Configuration design of the optical components of such systems used in the presently described methods will be readily understood by the relevant ordinary skilled artisan.

In some embodiments, external power may be applied to a light beam emitter such the light beam emitter emits a light beam within the flow cytometric device. The light beam may be detected by a pre-flow cell detector (e.g., through the use of a beam splitter directing at least a portion of the light beam to the pre-flow cell detector) and at least a portion of the light beam may pass through the flow cell. In some instances, the pre-flow cell detector may be a detector having a primary purpose of assessing the light beam (e.g., the quality of the light beam, the quality or performance of the beam shaping optics, the power of the light beam, etc.). In some instances, the pre-flow cell detector may be a detector associated with the beam shaping optics of the flow cytometer, i.e., the detector may be a beam shaping optics (BSO) detector.

In some embodiments, the pre-flow cell detector may be present in, and be a component of, a laser module. In some embodiments, the pre-flow cell detector may be present outside of, and not be a component of, a laser module.

A laser module may or may not include a housing that houses at least the light beam emitter and allows the light beam thereof to exit the laser module (e.g., via an optical fiber) and transit toward the flow cell. Means employed to allow a light beam to exit a housing need not necessarily be limited to optical fibers and may, e.g., include other means such as but not limited to an aperture, a lens, etc. In addition, a laser module need not necessarily include a physically separate housing and the term "laser module" may, in some instances, refer simply to a collection of components that generate a light beam and allow the generated light beam to transit to other components of the system toward the flow cell, e.g., without necessarily being present within a physical housing separate from other components of the system.

In some instances, a light beam emitted by an emitter may encounter one or more optical components within a laser module. As noted above, in some instances, the pre-flow cell detector may be present in and/or be a component of a laser module. For example, a light beam emitted by an emitter may be directed (e.g., via a beam splitter) towards the pre-flow cell detector within the laser module. In some instances, a pre-existing component of the laser module, such as but not limited to e.g., a reference detector, such as a reference photodiode of the laser module, may serve as the pre-flow cell detector. Accordingly, within the laser module, the light beam may be split such that at least a portion of the beam is directed towards a pre-flow cell detector and at least a portion (e.g., the remaining portion) of the beam is directed to another component of the system (e.g., out of the laser module via an optical fiber). In some instances, a light beam that exits a laser module may proceed through one or more optical components outside the laser module (such as e.g., beam shaping optical components) before passing through a flow cell. Where present, such components may vary and may or may not include e.g., a BSO detector.

As noted above, a pre-flow cell detector employed in the herein described methods, may or may not be a component of the laser module itself. As such, with reference to the path of the light beam generated by the light beam emitter, the pre-flow cell detector employed in the described methods may be "upstream" or "downstream" of a point at which the light beam exits a laser module. For example, where an optical fiber is employed to pass the generated light beam from a laser module to another component of the system, the pre-flow cell detector may be positioned, with respect to the light path, upstream or downstream of the fiber. Accordingly, where a laser module is employed, the pre-flow cell detector may be positioned within or outside of the laser module provided that light of the light path is detected by the pre-flow cell detector prior to passing through the flow cell.

After passing through the flow cell, the light beam may be detected by a post-flow cell detector. In some instances, the post-flow cell detector may be a detector having a primary function of detecting light scatter, including e.g., a forward scatter detector or a side scatter detector. Such a device may include one or more components that measure the power of the light beam internally, including e.g., a calibrated optical power meter. Detectors and/or meters of the subject systems will vary and will generally include those detectors and/or meters capable of measuring light intensity. Light intensity may be measured and/or expressed by any convenient means including e.g., voltage (V), wattage (e.g., mW), luminescence, and the like.

Following measuring of the intensities of the pre-flow cell light beam and the post-flow cell light beam, a ratio of the pre- and post-light beam intensities may be calculated. In some instances, such a ratio may be calculated automatically within a system containing a computer processor programed with instructions to calculate the ratio. The calculated ratio may be compared to a reference ratio to assess the cleanliness of the flow cell. For example, in some instances, the reference ratio may be 1, including e.g., where equal pre- and post-flow cell light beam intensities may be expected to produce a ratio of 1.

Using a reference ratio of 1 as an example, when the calculated ratio is equal to 1, then the flow cell may be determined to be clean. When the calculated ratio is not equal to 1 (i.e., the calculated ratio is higher or lower than 1), then the flow cell may be predicted to be contaminated (i.e., a contaminant may be present on the flow cell). Similar comparisons between calculated and reference ratios may be performed where the ratio may be some value other than 1. In such, instances, the calculated and reference ratios may be compared to determine whether or not the calculated ratio matches the reference ratio.

In some instances, the reference ratio may be a number other than 1, including a number higher or lower than one, depending on the particular context. For example, in some instances, a light path in which flow cell cleanliness is assessed may include a known or expected drop in light beam intensity along the path, e.g., at the post-flow cell detector (e.g., as a result of some component in the optical path that prevents at least some light from reaching the post-flow cell detector). In such instances, the reference ratio may be greater than 1 as the ratio of pre-flow cell intensity to post-flow cell intensity may be predicted or expected to be high based on a known or expected decrease in the post-flow cell intensity. In some instances, the calculation may be calibrated to account for such known or expected decreases in intensity and may, e.g., be recalibrated to 1.

In some instances, a light path in which flow cell cleanliness is assessed may include a known or expected increase in light beam intensity, e.g., at the post-flow cell detector (e.g., as a result of some signal amplifying component that increases the measured intensity from the post-flow cell detector). In such instances, the reference ratio may be less than 1 as the ratio of pre-flow cell intensity to post-flow cell intensity may be predicted or expected to be low based on a known or expected increase in the post-flow cell intensity. In some instances, the calculation may be calibrated to account for such known or expected decreases in intensity and may, e.g., be recalibrated to 1.

In some instances, calculating the ratio of the pre- and post-flow cell intensities may include reverse-calculating an emitter power value (e.g., an internal laser power) from each of the pre- and post-flow cell light beam intensities to obtain the ratio. In some instances, comparison of the ratios of back calculated internal laser power from the measured intensity at the detectors may be utilized to assess the cleanliness of a flow cell. In some instances, by basing the comparison on a ratio of values (e.g., the ratio of pre- and post-flow cell light beam intensities and/or the ratio of back-calculated internal laser power) the comparison may be made independent of the absolute power used in generating the emitted light beam.

In some instances, the methods may include setting the light beam power to a predetermined setting prior to performing a flow cell cleanliness assay. For example, in some instances, particular calculated ratios may be influenced or otherwise dependent on the initial intensity or power of the light beam and, as such, the method may include establishing the initial light beam intensity or power prior to performing the cleanliness assessment. In some instances, a desired light beam power may be established prior to performing a cleanliness assessment based on a default power setting. In some instances, a desired light beam power may be established prior to performing a cleanliness assessment based on the sample to be analyzed. For instance, a sample or a small aliquot of sample may be run on the flow cytometer and the light beam power may be adjusted to correspond to that necessary to properly assay the sample; at which point cell-free medium may be run back through the flow cell and a cleanliness analysis may be performed.

The present methods provide for real time monitoring of the cleanliness of a flow cell of a flow cytometric instrument. By "real time monitoring" is meant that monitoring may be performed on the fly during normal operation of the flow cytometer. For example, during normal processing of samples in a flow cytometric device cell-free medium may be flowed through the flow cell and a cleanliness assay may be performed. Cleanliness assays may be scheduled or on-demand or a combination thereof. For example, in some instances, a cleanliness monitoring assay may be performed between sample runs, including e.g., between each sample run. In some instances, the flow cytometric device for which cleanliness monitoring is performed may be a multi-sample processing device and, in such instances, a cleanliness assay may be scheduled between a particular number of pre-loaded samples, including e.g., between each pre-loaded sample.

Real time monitoring may also allow for the interruption of a sample run for execution of a cleanliness assay. For example, the flow of a sample through the flow cell may be interrupted such that cell-free medium may be flowed through the flow cell and a cleanliness assay may be performed. Following performance of the cleanliness assay, where the flow cell is determined to be cleaned or determined to be contaminated and subsequently cleaned, the sample run may be resumed.

Various aspects of the herein described methods may be automated. For example, whether scheduled or on-demand, execution of a cleanliness assessment may be automated. In some instances, institution of a cleanliness assay may be automatically triggered on a regular schedule, including after a particular number of sample runs (including each sample run), after a particular amount of operation time, and the like. In some instances, institution of a cleanliness assay may be automatically triggered as a result of a particular readout during a sample run. For example, in some instances, production of data outside of a predetermined range may trigger an automated assessment of flow cell cleanliness.

In some instances, the result of a cleanliness assessment may trigger automated functions of the flow cytometric device. For example, where a cleanliness analysis indicates that the flow cell is contaminated a cleaning procedure may be automatically triggered. In some instances, where a cleanliness analysis indicates that the flow cell is clean a sample run may be automatically initiated. In some instances, automated functions dependent on the outcome of a cleanliness analysis or real time cleanliness monitoring may include signaling actions, including .e.g., signaling to a user that the flow cell is clean, signaling to a user that the flow cell is likely contaminated, signaling to a user that cleaning of the flow cell is required, signaling to a user that prior results generated require review because a contaminated flow cell has been detected, and the like. The discussion herein of particular examples where certain components of the system are automated it not intended to be limited, as essentially any system component or method step of the subject methods may be automated as desired.

The methods of the present disclosure involve the use of flow cytometric devices. Flow cytometry is a methodology using multi-parameter data for identifying and distinguishing between different particle (e.g., cell) types i.e., particles that vary from one another in terms of label (wavelength, intensity), size, scatter, etc., in a fluid medium. In flow cytometrically analyzing a sample, an aliquot of the sample is first introduced into the flow path of the flow cytometer. When in the flow path, the cells in the sample are passed substantially one at a time through one or more sensing regions, where each of the cells is exposed separately and individually to a source of light at a single wavelength (or in some instances two or more distinct sources of light) and measurements of cellular parameters, e.g., light scatter parameters, and/or biomarker parameters, e.g., fluorescent emissions, as desired, are separately recorded for each cell. The data recorded for each cell is analyzed in real time or stored in a data storage and analysis means, such as a computer, for later analysis, as desired.

More specifically, in a flow cytometer, the cells are passed, in suspension, substantially one at a time in a flow path through one or more sensing regions where in each region each cell is illuminated by an energy source. The energy source may include an illuminator that emits light of a single wavelength, such as that provided by a laser (e.g., He/Ne or argon) or a mercury arc lamp with appropriate filters. For example, light at 488 nm may be used as a wavelength of emission in a flow cytometer having a single sensing region. For flow cytometers that emit light at two distinct wavelengths, additional wavelengths of emission light may be employed, where specific wavelengths of interest include, but are not limited to: 405 nm, 535 nm, 561 nm, 635 nm, 642 nm, and the like.

In series with a sensing region, detectors, e.g., light collectors, such as photomultiplier tubes (or "PMT"), an avalanche photodiode (APD), etc., are used to record light that passes through each cell (generally referred to as forward light scatter), light that is reflected orthogonal to the direction of the flow of the cells through the sensing region (generally referred to as orthogonal or side light scatter) and fluorescent light emitted from the cells, if it is labeled with fluorescent marker(s), as the cells passes through the sensing region and is illuminated by the energy source. Each type of data that is obtained, e.g., forward light scatter (or FSC), orthogonal light scatter (SSC), and fluorescence emissions (FL1, FL2, etc.), comprise a separate parameter for each cell (or each "event").

Flow cytometers further include data acquisition, analysis and recording means, such as a computer, wherein multiple data channels record data from each detector for each cell as it passes through the sensing region. The purpose of the analysis system is to classify and count cells wherein each cell presents itself as a set of digitized parameter values and to accumulate data for the sample as a whole. In flow cytometrically assaying cells in methods of the instant disclosure, the flow cytometer may be set to trigger on a selected parameter in order to distinguish the cells of interest from background, noise and/or a preset limit. "Trigger" refers to a preset threshold for detection of a parameter. It is typically used as a means for detecting passage of cell through the laser beam or electrical field. Detection of an event which exceeds the threshold for the selected parameter triggers acquisition of data for the cells, including light scatter and fluorescence data. Data is not acquired for cells or other components in the medium being assayed which cause a response below the threshold. In some instances, the trigger parameter may be the detection of forward scattered light caused by passage of a cell through the light beam. The flow cytometer then detects and collects data for the cell, including light scatter data, fluorescence data, and the like.

A particular subpopulation of interest is then further analyzed by "gating" based on the data collected for the entire population. To select an appropriate gate, the data is plotted so as to obtain appropriate separation of subpopulations, e.g., by adjusting the configuration of the instrument, including e.g., excitation parameters, collection parameters, compensation parameters, etc. In some instances, this procedure is done by plotting forward light scatter (FSC) vs. side (i.e., orthogonal) light scatter (SSC) on a two dimensional dot plot. The flow cytometer operator then selects the desired subpopulation of cells (i.e., those cells within the gate) and excludes cells which are not within the gate. Where desired, the operator may select the gate by drawing a line around the desired subpopulation using a cursor on a computer screen. Only those cells within the gate are then further analyzed by plotting the other parameters for these cells, such as fluorescence.

Non-limiting examples of flow cytometer systems include those available from commercial suppliers including but not limited to, e.g., Becton-Dickenson (Franklin Lakes, N.J.), Life Technologies (Grand Island, N.Y.), Acea Biosciences (San Diego, Calif.), Beckman-Coulter, Inc. (Indianapolis, Ind.), Bio-Rad Laboratories, Inc. (Hercules, Calif.), Cytonome, Inc. (Boston, Mass.), Amnis Corporation (Seattle, Wash.), EMD Millipore (Billerica, Mass.), Sony Biotechnology, Inc. (San Jose, Calif.), Stratedigm Corporation (San Jose, Calif.), Union Biometrica, Inc. (Holliston, Mass.), Cytek Development (Fremont, Calif.), Propel Labs, Inc. (Fort Collins, Colo.), Orflow Technologies (Ketchum, Id.), handyem inc. (Québec, Canada), Sysmex Corporation (Kobe, Japan), Partec Japan, Inc. (Tsuchiura, Japan), Bay bioscience (Kobe, Japan), Furukawa Electric Co. Ltd. (Tokyo, Japan), On-chip Biotechnologies Co., Ltd (Tokyo, Japan), Apogee Flow Systems Ltd. (Hertfordshire, United Kingdom), and the like.

As summarized above, the present disclosure also provides flow cytometers capable of monitoring the cleanliness of a flow cell contained within the flow cytometer. Such flow cytometers may be specifically programed to perform flow cell cleanliness monitoring, including e.g., where the flow cytometer includes a computing device having instructions that, when executed by the computing device, cause the flow cytometer to monitor the cleanliness of the flow cell. Steps involved in such monitoring may include e.g., emitting a light beam from the light emitter through the flow cell, measuring the intensity of the light beam at the pre-flow cell detector and the post-flow cell detector, calculating a ratio of the measured intensities of the light beam at the pre- and post-flow cell detectors, and performing a comparison. Subject comparisons that may be performed by such a device include e.g., comparing the calculated ratio to a reference ratio stored on the computing device to assess the cleanliness of the flow cell. In some instances, the device may be programed such that a match between the calculated ratio and the reference ratio indicates that the flow cell is clean and a mismatch between the calculated ratio and the reference ratio indicates that a contaminant is present on the flow cell.

In some instances, a flow cytometry system may be specifically programed cause the flow cytometer to reverse-calculate an emitter power value from each of the pre- and post-flow cell light beam intensities to obtain the calculated ratio used in monitoring flow cell cleanliness. Flow cytometers capable of flow cell monitoring, e.g., according to the methods described herein, may be configured to perform real-time monitoring of flow cell cleanliness. Real time cleanliness monitoring may be performed according to any convenient schedule, including e.g., once per assay, including e.g., before each assay run, after each assay run, during each assay run, and the like. In some instances, the flow cytometer may be configured to assay cleanliness of the flow cell at any time when cell-free medium is present in the flow cell.

A flow cytometer may be a stand-alone unit or may be a component of a more complex analysis system. For example, in some instances, a flow cytometer is a component of a hematology analyzer.

In a hematology analyzer, at least in part, blood cells may pass through a laser beam in a stream of fluid (e.g., a diluent reagent) and scatter light in all angular directions. In some embodiments, light scattered in the forward direction (close to the laser beam propagation) is collected by a lens and directed to the annular photodiode detector separated in 5 different segments (channels).

As summarized above, flow cytometer systems (and hematology analyzer systems utilizing a flow cytometry component) will generally include an attached or integrated computer device and/or processor, wherein such devices/processors may be linked, in communication with one or more components of the flow cytometer (e.g., detectors) by any convenient means. The computing device(s) of a flow cytometer may perform various computing functions including e.g., uploading and/or downloading data, storing and/or retrieving data from one or more computer memories, data analysis and transformation (e.g., comparisons of data, e.g., performing one or more comparison steps of the herein described methods), and the like.

Computing devices may further control one or more electrical or optical components of a flow cytometer and/or contain instructions for directing such components to perform method steps related to the methods of the present disclosure. Computing devices may also display or otherwise transfer to a user a determination made by the computing device, e.g., based on a data comparison. Instructions for performing one or more functions or method steps may be stored on a computing device or, a memory (e.g., non-transitory memory) thereof, to be executed and cause the computing device to perform one or more of the instruction steps or cause a connected component (e.g., a flow cytometer component) to perform the one or more instruction steps.

For example, in some instances, data may be uploaded to, generated within or otherwise transferred to, a computing device allowing the computing device to make a comparison using the data, e.g., a comparison to an internally stored reference, or to a second obtained data set. In addition to comparisons, computing devices may also perform various calculations, including e.g., to produce a result, e.g., a score (such as a cleanliness score), a ratio calculation (e.g., according to an algorithm, e.g., a mathematical algorithm), to perform fitting functions (e.g., generate a "best-fit" approximation) and the like. In some embodiments, the methods may include comparing a calculated ratio (e.g. a ratio of the pre- and post-flow cell light beam intensities) to a reference ratio, e.g., to determine whether the ratios match, determine whether the flow cell is clean, determine whether a contaminate is present in the flow cell, etc.

Any data used or useful in the described methods may be stored in computer memory, including e.g., newly generated data, e.g., ratio data generated by flowing a sample or cell-free medium through a flow cell of the flow cytometer and analyzing. In some instances, reference data, e.g., reference ratios, etc., may be stored in computer memory, e.g., allowing comparison of the reference data to other data (e.g., generated data) within the computing device.

In some instances, the components of the systems as described herein may be connected by a wired data connection. Any suitable and appropriate wired data connection may find use in connecting the components of the described systems, e.g., as described herein, including but not limited to e.g., commercially available cables such as a USB cable, a coaxial cable, a serial cable, a C2G or Cat2 cable, a Cat5/Cat5e/Cat6/Cat6a cable, a Token Ring Cable (Cat4), a VGA cable, a HDMI cable, a RCA cable, an optical fiber cable, and the like. In some instances, e.g., where data security is less of a concern, wireless data connections may be employed including but not limited to e.g., radio frequency connections (e.g., PAN/LAN/MAN/WAN wireless networking, UHF radio connections, etc.), an infrared data transmission connection, wireless optical data connections, and the like.

The devices and systems of the instant disclosure may further include a "memory" that is capable of storing information such that it is accessible and retrievable at a later date by a computer. Any convenient data storage structure may be chosen, based on the means used to access the stored information. In certain aspects, the information may be stored in a "permanent memory" (i.e. memory that is not erased by termination of the electrical supply to a computer or processor) or "non-permanent memory". Computer harddrive, CD-ROM, floppy disk, portable flash drive and DVD are all examples of permanent memory. Random Access Memory (RAM) is an example of non-permanent memory. A file in permanent memory may be editable and re-writable.

Substantially any circuitry can be configured to a functional arrangement within the devices and systems for performing the methods disclosed herein. The hardware architecture of such circuitry, including e.g., a specifically configured computer, is well known by a person skilled in the art, and can comprise hardware components including one or more processors (CPU), a random-access memory (RAM), a read-only memory (ROM), an internal or external data storage medium (e.g., hard disk drive). Such circuitry can also comprise one or more graphic boards for processing and outputting graphical information to display means. The above components can be suitably interconnected via a bus within the circuitry, e.g., inside a specific-use computer. The circuitry can further comprise suitable interfaces for communicating with general-purpose external components such as a monitor, keyboard, mouse, network, etc. In some embodiments, the circuitry can be capable of parallel processing or can be part of a network configured for parallel or distributive computing to increase the processing power for the present methods and programs. In some embodiments, the program code read out from the storage medium can be written into a memory provided in an expanded board inserted in the circuitry, or an expanded unit connected to the circuitry, and a CPU or the like provided in the expanded board or expanded unit can actually perform a part or all of the operations according to the instructions of the programming, so as to accomplish the functions described.

In addition to the components of the devices and systems of the instant disclosure, e.g., as described above, systems of the disclosure may include a number of additional components, such as data output devices, e.g., monitors and/or speakers, data input devices, e.g., interface ports, keyboards, etc., actuatable components, power sources, etc.

The instant disclosure includes methods that may involve the use of computer readable medium, including non-transitory computer readable medium, which stores instructions for methods described herein. Aspects of the instant disclosure include computer readable medium storing instructions that, when executed by a computing device, cause the computing device to perform one or more steps of a method as described herein.

In certain embodiments, instructions in accordance with the methods described herein can be coded onto a computer-readable medium in the form of "programming", where the term "computer readable medium" as used herein refers to any storage or transmission medium that participates in providing instructions and/or data to a computer for execution and/or processing. Examples of storage media include a floppy disk, hard disk, optical disk, magneto-optical disk, CD-ROM, CD-R, magnetic tape, non-volatile memory card, ROM, DVD-ROM, Blue-ray disk, solid state disk, and network attached storage (NAS), whether or not such devices are internal or external to the computer. A file containing information can be "stored" on computer readable medium, where "storing" means recording information such that it is accessible and retrievable at a later date by a computer.

The computer-implemented method described herein can be executed using programming that can be written in one or more of any number of computer programming languages. Such languages include, for example, Java (Sun Microsystems, Inc., Santa Clara, Calif.), Visual Basic (Microsoft Corp., Redmond, Wash.), and C++ (AT&T Corp., Bedminster, N.J.), as well as any many others.

The following examples are offered by way of illustration and not by way of limitation.

EXAMPLES

Example 1: ALL/BSO Ratio as Indicator of Flow Cell Cleanliness

Figure 1:
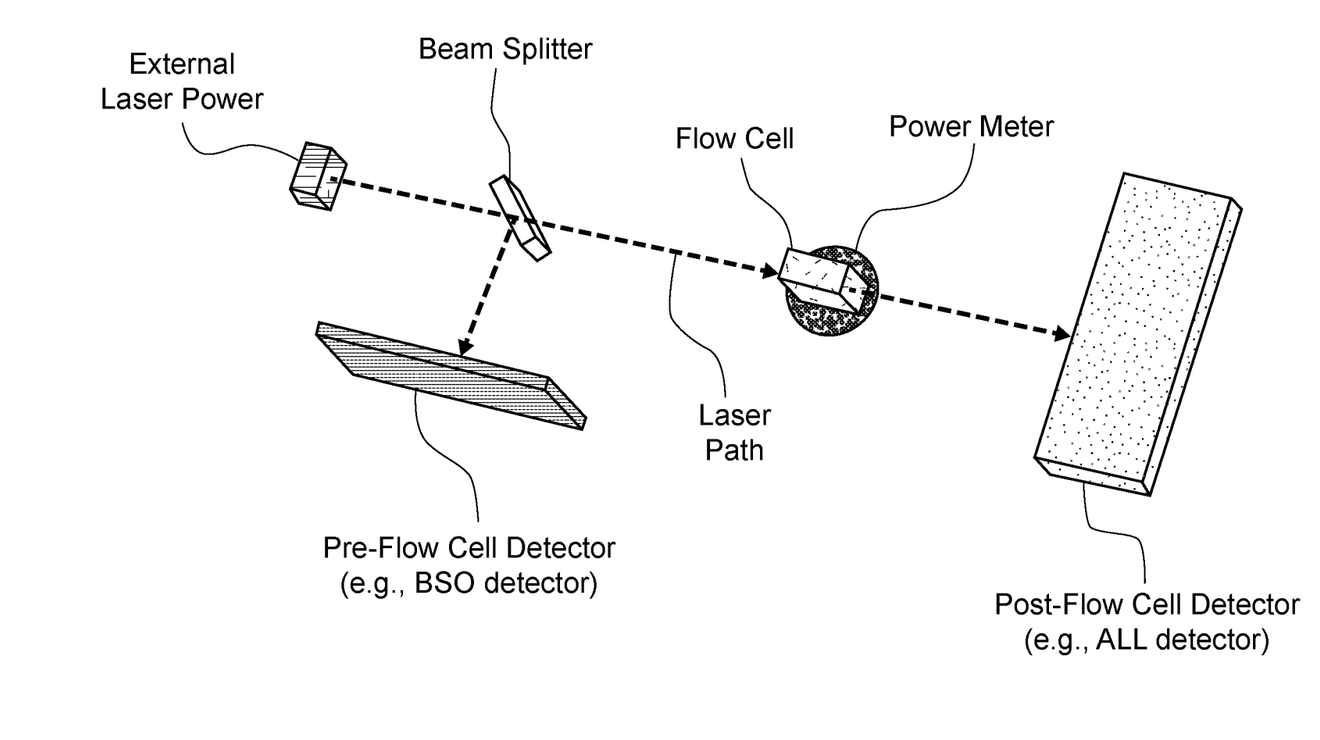
FIG. 1 depicts a beam path contained within a flow cytometer relevant to Example 1 and having a pre-flow cell detector located in the beam shaping optics (BSO) and a post-flow cell detector (ALL).

A flow cytometric component of a histology analyzer, having the arrangement of components depicted in FIG. 1, was used in deriving an ALL/BSO ratio-based flow cell cleanliness assessment. As depicted in FIG. 1, laser power is provided externally to the system and the laser path encounters a beam splitter prior to reaching the flow cell. The laser beam is split at the beam splitter, sending a portion of the beam to BSO detector for BSO measurement and a portion of the beam to the flow cell, where the beam passes through the flow cell to arrive at the ALL detector for ALL measurement. The internal power of the beam may be measured internally by a calibrated optical power meter.

A scheme for monitoring flow cell cleanliness by computing the ratio of pre- and post-flow cell beam power using measurements at the BSO and ALL detectors was derived. Calibration curves for signal vs. internal laser power were computed for both the BSO and ALL detectors. Specifically, xy-plots of the internal laser power (mW) vs. the measured detector signal (volts) were generated for each detector at various laser powers. Lines were fitted to the data of the xy-plots for each detector (BSO $R^2=1$, ALL $R^2=0.99$) and the corresponding slopes and y-intercepts were determined for each fitted line to derive the following equation for each detector:

$$(\text{measured detector signal}) = (\text{slope}) \times (\text{internal laser power}) + (y \text{ intercept})$$

The above equations were transformed to compute the internal laser power as a function of measured detector signal for each detector. The resulting equations were:

$$(\text{int.laser power})_{BSO} = -((\text{meas.detector sig.})_{BSO} - (y \text{ intercept})_{BSO}) \div (\text{slope})_{BSO}$$

and $$(\text{int.laser power})_{ALL} = -((\text{meas.detector sig.})_{ALL} - (y \text{ intercept})_{ALL}) \div (\text{slope})_{ALL}$$

A clean flow containing cell-free medium is essentially optically transparent and, as such, the pre-flow cell laser power should be equal to the post-flow cell laser power. Therefore the ratio of the ALL internal laser power to the BSO internal laser power of a clean flow cell can be set to one. Thus, the ratio represented with the above equations becomes:

$$\frac{ALL}{BSO} = \frac{((meas.detector\ sig.)_{ALL} - (y\ intercept)_{ALL}) \times (slope)_{BSO}}{((meas.detector\ sig.)_{BSO} - (y\ intercept)_{BSO}) \times (slope)_{ALL}} = 1$$

Accordingly, it was determined that the ALL/BSO ratio can be calculated via internal laser power. Furthermore, because a clean flow cell results in a ratio of 1, deviation from this ratio (e.g., a ratio of less than 1) may be used as an indicator of flow cell cleanliness.

The calibration of ALL versus laser power was further investigated at different ALL gains, including e.g., ALL gain set to "0", ALL gain set to "2000", ALL gain set to "4000". It was found that the ALL signal measurement as well as slope and intercept for ALL vs. laser power (internal and external) calibration curve depend on ALL gain setting. As such, it was determined that to be able to set the ALL/BSO ratio as equal to 1 for the clean flow cell condition, an ALL calibration curve may be created using ALL data at the same ALL gain setting for which further measurements are performed, including those intended to indicate whether the flow cell is clean and/or generate a flag when the flow cell cleanliness is outside of an acceptable performance tolerance.

The above example illustrates the derivation of an internal power pre- and post-flow cell measurement ratio that may be used to assess flow cell cleanliness and establishes an approach for real-time flow cell cleanliness monitoring in a flow cytometric system. This approach is independent of laser power used for the assay, as each assay may be run at different laser power. Calibration curves, e.g., derived according to the above approach or adapted therefrom, may be obtained prior to installation of an optics module into a flow cytometric system. This approach for real-time measurement of flow cell cleanliness may be performed at any convenient time that the flow cell contains a cell-free medium, including e.g., immediately before an assay.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

What is claimed is:

1. A computer-implemented method for executing instructions stored on a non-transitory computer-readable medium for assessing cleanliness of a flow-cytometer, comprising the following steps performed by one or more computer processors:
    a) flowing a cell-free medium through the flow cell of the flow cytometer, wherein the cell-free medium is substantially free of any light scattering particles as well as free of any light absorbing particles;
    b) emitting a light beam from an emitter towards the flow cell and, before the light beam enters the flow cell, measuring the intensity of the light beam with a pre-flow cell detector to obtain a pre-flow cell light intensity,
    c) permitting the light beam emitted from the emitter to pass through the flow cell containing the cell-free medium;
    d) measuring the intensity of the light beam after the light beam has passed through the flow cell by a post-flow cell detector to obtain a post-flow cell light beam intensity;
    e) calculating a ratio of the pre- and post-flow cell light beam intensities; and
    f) comparing the calculated ratio of the pre- and post-flow cell light beam intensities to a reference ratio; and
    g) determining the flow cell to be clean when the calculated ratio matches the reference ratio and determining the flow-cell to be contaminated when the calculated ratio does not match the reference ratio.

2. The method according to claim 1, wherein the calculating comprises reverse-calculating an emitter power value from each of the pre- and post-flow cell light beam intensities to obtain the ratio.

3. The method according to claim 1, wherein the ratio of the pre- and post-flow cell light beam intensities is independent of the light power used in the emitting.

4. The method according to claim 1, wherein the pre-flow cell detector is a designated cleanliness-monitoring detector.

5. The method according to claim 1, wherein the pre-flow cell detector is a multi-use detector.

6. The method according to claim 5, wherein the pre-flow cell detector performs a light emitter quality control function.

7. The method according to claim 1, wherein the post-flow cell detector is a designated cleanliness-monitoring detector.

8. The method according to claim 1, wherein the post-flow cell detector is a multi-use detector.

9. The method according to claim 8, wherein the post-flow cell detector is a forward scatter detector.

10. The method according to claim 1, wherein the path of the light beam comprises a beam-splitter.

11. The method according to claim 10, wherein the beam-splitter directs a first portion of the light beam to the pre-flow cell detector and a second portion of the light beam to the flow cell.

12. The method according to claim 1, wherein the flow cell is constructed of an optically transparent material selected from the group consisting of: glass, quartz and plastic.

13. The method according to claim 1, wherein the flow cytometer is a component of a hematology analyzer.

14. The method according to claim 13, wherein steps a) to g) carried out in the flow cytometer are automated.

15. The method according to claim 1, wherein the cell-free medium is selected from the group consisting of: deionized water, sheath solvent, buffer, cell culture media, and combinations thereof.

16. The method according to claim 1, wherein the contaminant is protein or crystalized salts.

17. The method according to claim 1, wherein a cleaning of the flow cell is triggered when a contaminant is indicated.

18. The method according to claim 1, wherein a fluid sample run is triggered when the flow cell is indicated as clean.

19. The method according to claim 1, wherein the method further comprises running a fluid sample through the flow cell before or after assessing the cleanliness of the flow cell.

20. The method according to claim 1, wherein the method further comprises calibrating the flow cell prior to assessing of the cleanliness of the flow cell.

21. The method according to claim 1, wherein the method further comprises cleaning the flow cell prior to assessing of the cleanliness of the flow cell.

22. The method according to claim 1, wherein the method comprises assessing the cleanliness of the flow cell during emission of a first light beam from a first emitter and a second light beam from a second emitter.

23. The method according to claim 22, wherein the first emitter emits light at a first power and the second emitter emits light at a second power.

24. The method according to claim 1, wherein the method further comprises assessing the cleanliness of the flow cell during emission of a third light beam from a third emitter.

25. The method according to claim 24, wherein the third emitter emits light at a third power.

26. The method according to claim 1, wherein the method comprises real-time monitoring of the cleanliness of the flow cell.

* * * * *